United States Patent [19]

Kim

[11] Patent Number: 4,821,264

[45] Date of Patent: Apr. 11, 1989

[54] ADAPTIVE CONCENTRATION COMMUNICATION NETWORK ISDN ACCESS

[75] Inventor: Noshik Kim, Middletown, N.J.

[73] Assignee: Bell Communications Research, Inc., Livingston, N.J.

[21] Appl. No.: 152,347

[22] Filed: Feb. 4, 1988

[51] Int. Cl.$^4$ .............................. H04J 3/12; H04J 3/24
[52] U.S. Cl. .................................... 370/110.1; 370/94; 340/825.5
[58] Field of Search ........................ 370/13, 17, 60, 94, 370/95, 110.1, 89, 67, 56; 340/825.5, 825.51

[56] References Cited

U.S. PATENT DOCUMENTS

| | | | |
|---|---|---|---|
| 4,475,192 | 10/1984 | Fernow et al. | 370/60 |
| 4,499,576 | 2/1985 | Fraser | 370/60 |
| 4,592,047 | 5/1986 | Fundneider | 370/67 |
| 4,644,533 | 2/1987 | Braff et al. | 370/60 |
| 4,646,294 | 2/1987 | Eliscu et al. | 370/94 |

OTHER PUBLICATIONS

"A Model for Evaluating the Performance of an Integrated Circuit- and Packet-Switched Multiplex Structure", *IEEE Transactions on Communications*, vol. Com. 24, No. 2, Feb. 1976, M. J. Fischer and T. C. Harris.

"Analysis of Integrated Voice/Data Multiplexing", *IEEE Transactions on Communications*, vol. Com. 32, No. 2, Feb. 1984, Alan G. Konheim and Raymond L. Pickholtz.

*Primary Examiner*—Douglas W. Olms
*Assistant Examiner*—Wellington Chin
*Attorney, Agent, or Firm*—James W. Falk; John T. Peoples

[57] ABSTRACT

A structure and methodology is disclosed for adaptively concentrating Integrated Services Digital Network (ISDN) B and D channel basic access on carrier systems. Central station 93 receives B and D channel requests on the D channel, combines this information with the status of queue storage device 11 transmitted from remote terminal 92, determines the allocation for B and D channel access, and transmits this information to the remote terminal, where the allocation is made at multiplexer 5.

9 Claims, 4 Drawing Sheets

ADAPTIVE CONCENTRATION COMMUNICATION NETWORK ISDN ACCESS

FIELD OF THE INVENTION

The invention relates generally to communication networks. Specifically, it relates to a communications system for customer access to an Integrated Services Digital Network (ISDN).

BACKGROUND OF THE INVENTION

Basic ISDN service allows a telecommunications customer to have access simultaneously to two 64 kbps (kilobits per second) communication paths ("B" channels) and one 16 kbps path ("D" channel) on a switched telecommunications network. The D channel is a packet traffic channel which includes signaling for the two B channels, whereas the B channels can be either circuit or packet traffic channels. Accordingly, the request for service on a B channel would be made in packet form on the D channel, along with such signaling information as the destination address and the type of traffic on the B channel, as well as general packet data transmission.

Basic ISDN can be served by a telecommunications supplier bringing three logically separate circuit paths (two B's and one D) to the customer's premises, or multiplexing the circuits onto a carrier system. In the latter case, the customer's three circuits would be brought from the customer premises to a remote terminal, where the three circuits could be combined with other customers' circuits (ISDN or other services) and multiplexed together to be transported via carrier systems to the supplier's central station. For example, "T-carrier" could be utilized to transport 24 circuits (for example, 8 ISDN customers) on two pairs of wire from the remote terminal to the central station, thereby reducing the cost of transport compared with 24 pairs of wire from various customer premises to the central station.

The carrier system approach can either be dedicated or concentrated. For example, a T-carrier system could either be established to service 24 customer channels (dedicated), or could serve 50 customer channels on a first-come first-served basis (concentrated). The dedicated system may be more costly, but no traffic requests would be denied. The concentrated system would require less transmission facilities to serve an equivalent number of customer lines, but service might be denied in some cases. For instance, if 25 of the 50 customer channels had service requests in the concentrated example above, one of the requests would be denied, as the T-carrier system could only accommodate 24 channels.

Concentration schemes have been proposed for ISDN wherein a fixed number of channels would be set aside for D channel use, and the remaining channels would be set aside for B channel use. This allocation process has been suggested for two basic reasons. First, since the D channel is 16 kbps, and a carrier channel can handle 64 kbps, four D channels can be multiplexed onto one carrier channel. Also, since requests for B channel connections and disconnections are transmitted over the D channel, if B channel traffic used up the carrier system's capacity, D channel requests would be blocked, including requests for The problem with such an allocation process is that it may be inefficient and prone to blockage. If the B channel allocation is used up, and the D channel denied, even though the T-carrier system would not be at full capacity. Conversely, the D channels could be fully utilized, and requests for additional D channel service would be denied even though spare B channels are available.

Adaptive concentration schemes (usually known as "Movable Boundary" techniques) have been previously proposed for handling combinations of circuit traffic and packet traffic over the same network (e.g., M. J. Fischer and T. C. Harris, "A Model for Evaluating the Performance of an Integrated Circuit- and Packet-Switched Multiplex Structure", IEEE Transactions on Communications, Vol. COM-24, No. 2, February 1976). The application of these techniques to ISDN networks has not been previously envisioned. There are two basic reasons why this has not been contemplated before. The first is that, historically, circuit and packet transmissions were independent of one another. Therefore, the object was to handle as many circuits in the network as possible with no interaction between the two types. With ISDN, as previously discussed, requests for circuit transmissions (B channels) are made over the packet circuits (D channels). Standard movable boundary techniques would not address this situation, because standard techniques do not allow for the interdependencies of circuits. Requests for service would be made over the same circuit as the service. Where requests for service arrive over a different circuit, the adaptive concentration switch must translate messages on one circuit in order to determine the demands for service on other circuits.

Second, the standard movable boundary situation involves a single switching point with a limited amount of outgoing circuit capacity, and therefore would adaptively allocate the circuit and packet demands at that location. ISDN is a much more complex situation. The limited circuit capacity is between two offices (remote terminal and central station). Further, the queuing of packet channel requests for B channel service would be received and interpreted at the central station, and the remote terminal is required to physically switch the customer lines to available channels on the communications link between the remote terminal and the central station. A standard adaptive concentration switch would simply link incoming channels with outgoing channels, while queuing data from packet channels. In other words, a standard adaptive concentration switch would be but one node in a network.

SUMMARY OF THE INVENTION

These and other difficulties are obviated, in accordance with the present invention, by configuring a basic ISDN network to exploit an enhanced adaptive concentration technique. Utilizing the enhanced technique, the basic ISDN network is arranged so that a temporary overflow of B channel requests can request spare D channel capacity, a temporary overflow of D channel requests can request spare B channel capacity, and a network controller insures that conflicts in demand requests will be met according to a pre-arranged priority selection rules.

DETAILED DESCRIPTION

Figure 1:
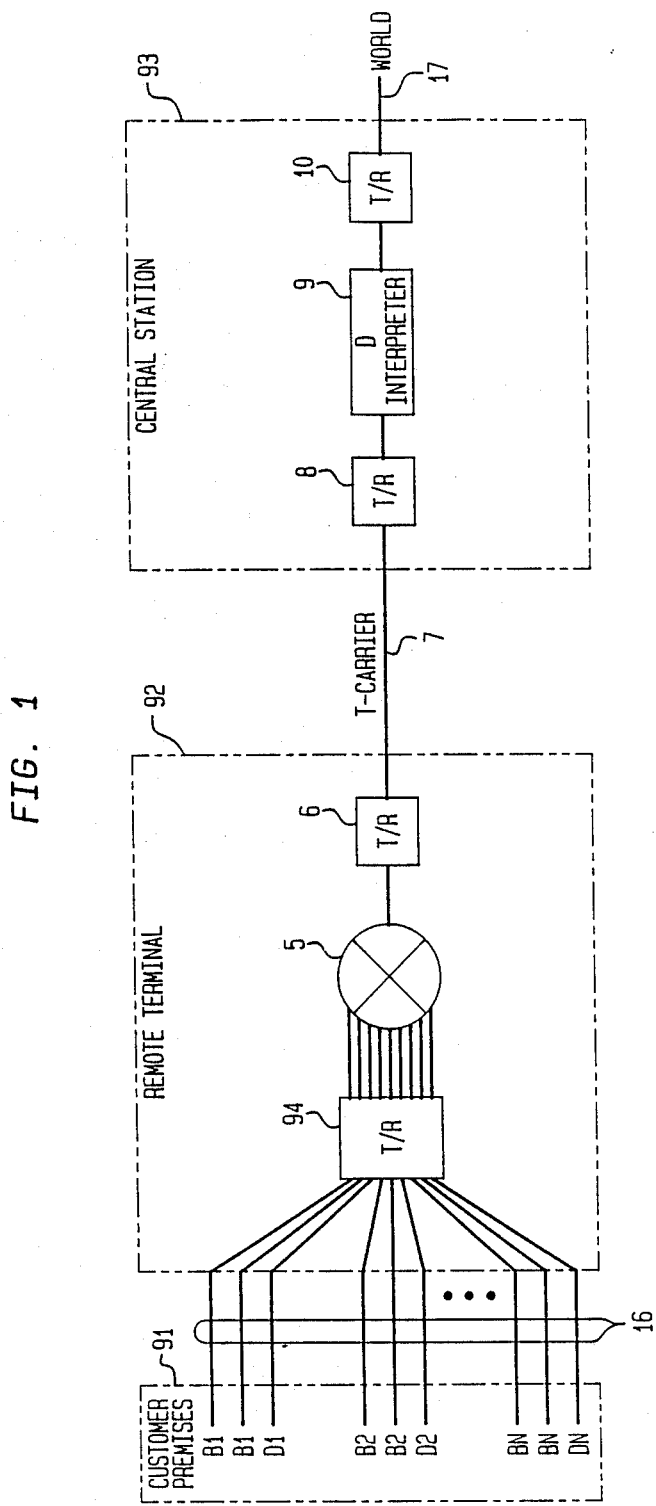
FIG. 1 is a block diagram of an ISDN access network.

The standard arrangement of basic ISDN utilizing a remote terminal is shown in FIG. 1. Individual B and D channel bi-directional circuits 16 (B1,B1,D1,B2,B2,D2, ... BN,BN,DN) originate at various (T/R) 94 in remote terminal 92. Multiplexer 5 then interconnects channels 16 requesting service to available outgoing channels on T-carrier system 7 via T/R 6 on a first-come first-served basis. The carrier channels of T-carrier system 7 make up the conventional link between remote terminal 92 and central station 93, and terminate in central station 93 in associated T/R 8. D channel interpreter 9 determines if additional B channels should be set up or disconnected on trunk group 17 via T/R 10.

Figure 2:
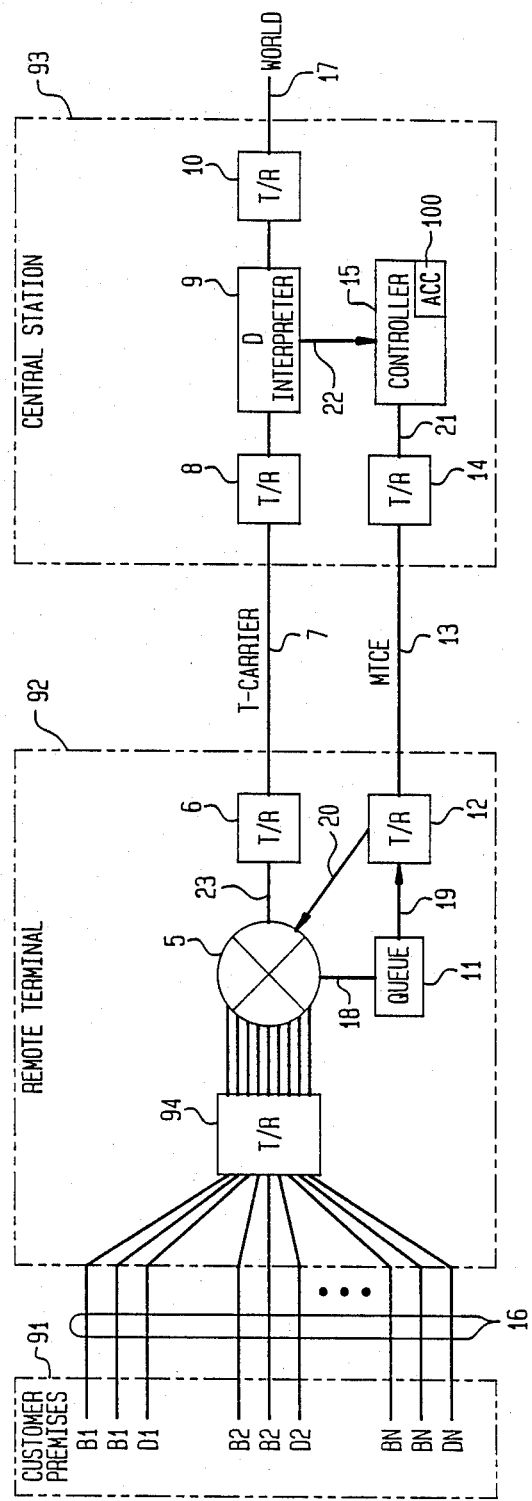
FIG. 2 is a block diagram of an ISDN access network with adaptive control capability in accordance with the present invention.

In order to transform the standard arrangement into an adaptive concentration network, several changes must be made, as shown in FIG. 2. Queue storage device 11 is placed in remote terminal 92 in order to store D channel packets that are not immediately transported from lines 16 to the conventional link, i.e. T-carrier system 7. Multiplexer 5 transfers packets for which no outgoing trunks are available on T-carrier system 7 to queue storage device 11 over line 18. Queue storage device 11 would periodically communicate its current fill level (utilization) via line 19 (uni-directionality is shown by an arrow; otherwise, bi-directionality is presumed), T/R 12, maintenance channel 13, T/R 14, and line 21 to controller 15. The combination of maintenance channel 13 with conventional link 7 results in an enhanced link for adaptive concentration. Interpreter 9 would interpret B and D channel requests by translating associated signals on the D channels, and periodically transmit these requests to controller 15 over line 22. With this information, and pre-specified rules, controller 15 determines which trunks 23 at remote terminal 92 should be allocated for B channel use and which should be allocated for D channel use. This process is more fully described below. The allocation determination is then sent from controller 15 to multiplexer 5 via line 21, T/R 14, maintenance channel 13, T/R 12, and line 20. Multiplexer 5 then appropriately interconnects outgoing trunks 23 with queued D channel packets from queue storage device 11 and incoming lines 16. In this way, maximum utility and minimum blockage occur in the concentration of ISDN traffic. When blockage does occur, controller 15 directs the flow according to predetermined priorities, such as the following illustrative example.

Figure 3:
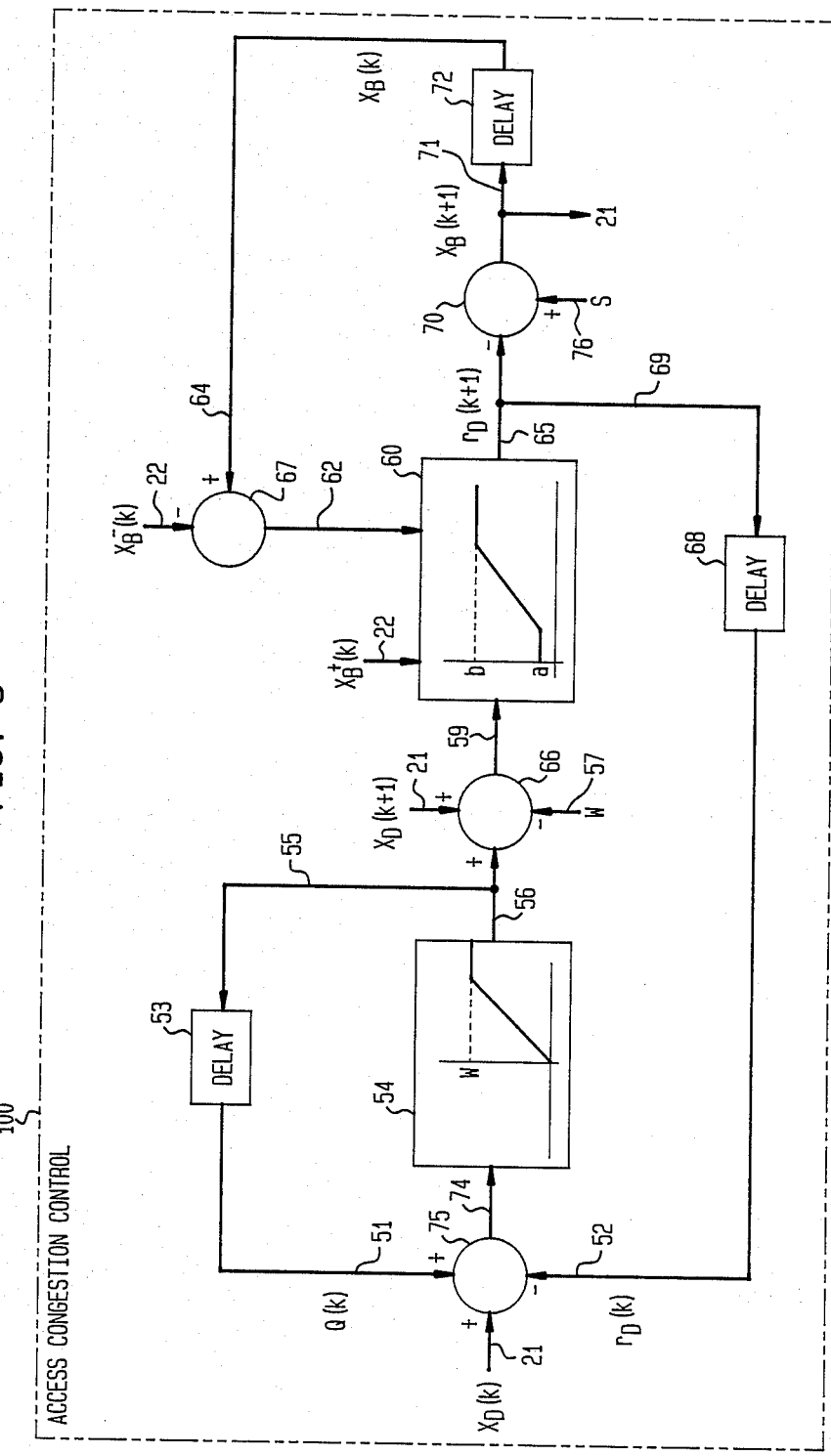
FIG. 3 is a schematic diagram of the Access Congestion Control process.

FIG. 3 depicts illustrative Access Congestion Control (ACC) mechanism 100 embedded in controller 15 (FIG. 2). An illustrative set of priority rules governing this example are:

1. Circuit traffic has priority over packet traffic as long as queue storage device 11 is not full;
2. No circuit traffic will be cut off without a disconnect request from the user; and
3. If queue storage device 11 is full, no requests for additional circuit traffic will be honored.

The following terms will be used to further detail the workings of controller 15:

Q = Current queue fill
W = Queue capacity
$X_D$ = D channel requests
$r_D$ = channels allocated for D channel traffic
$X_B$ = B channels in use
$X_B^+$ = requests for additional B channels
$X_B^-$ = requests for B channel disconnects
S = total channel capacity
k = reference time period
k+1 = present time period, subsequent to reference time period It can be seen that utilizing the aforementioned rules, the maximum number of channels available for D channel traffic at time k could be represented by "b", where:

$$b = S - [X_B(k) - X_B^-(k)].$$

The minimum number of channels available for D channel traffic at any point in time could be represented by "a" where:

$$a = S - [X_B(k) + X_B^+(k) - X_B^-(k)].$$

Referring to FIG. 3, D channel requests arriving on line 21 in time period k are combined with the existing queue level on line 51 and subtracted from the number of channels allocated for D traffic on line 52 in circuit 75 to arrive at the number calculated by circuit 54 of D channel packets on line 74 to be put in the queue storage device. The upper limit of quantity 54 is W, the queue capacity. The calculated quantity is then transmitted back to circuit 75 via line 55, but re-referenced to time interval k by delay circuit 53.

The queue level determined by circuit 54 is transmitted to circuit 66 over line 56, is combined with requests for D channels arriving over line 21 at time period k+1 (line 21 conves both the present request for D channels as well as the last request at interval k as stored by queue device 11), and reduced by W on line 57 to arrive at the number of D channel packets that must be transported in order to avoid the loss of any packets. This quantity is transmitted to circuit 60 over line 59. Circuit 60 combines this quantity with existing B channel usage (from line 64), less requests for B channel disconnects from line 22, as resolved in circuit 67, and transmitted to circuit 60 over line 62, and requests for additional B channel channels from line 22. The quantity represented on line 59 will be serviced as long as it does not exceed "b". If "a" is not exceeded, then all B channel usage will be handled. If the quantity represented on line 59 is between "a" and "b", then some portion of requests for B channel traffic will not be met. If the quantity on line 59 exceeds "b", then some D channel packets will be lost. The output of circuit 60 is the number of channels to be allocated in time period k+1 to D channel traffic, and is carried on line 65. This quantity is transmitted to circuit 75 via line 69, delay circuit 68, and line 52.

Output on line 65 of circuit 60 is also sent to circuit 70 which subtracts the quantity on line 65 from total circuit capacity "S" 76 to arrive at the number of channels allocated for B channel traffic, carried on line 71. This quantity is output to line 21, and is delayed one time period in circuit 72, and transmitted to circuit 67 over line 64.

It should be readily apparent that time period k should not exceed the time needed to transmit one packet. It should be further apparent that alternative priority rules could be used with this network, including dynamically changing the rules in response to real-time traffic flow.

Several anticipated difficulties may be beneficially alleviated by the network in accordance with the present invention, or with slight variations thereon. First, as discussed previously, if no D channels are available to request B channel disconnects, deadlock would result. This situation can be prevented by allocating one channel exclusively for D channel traffic.

Figure 4:
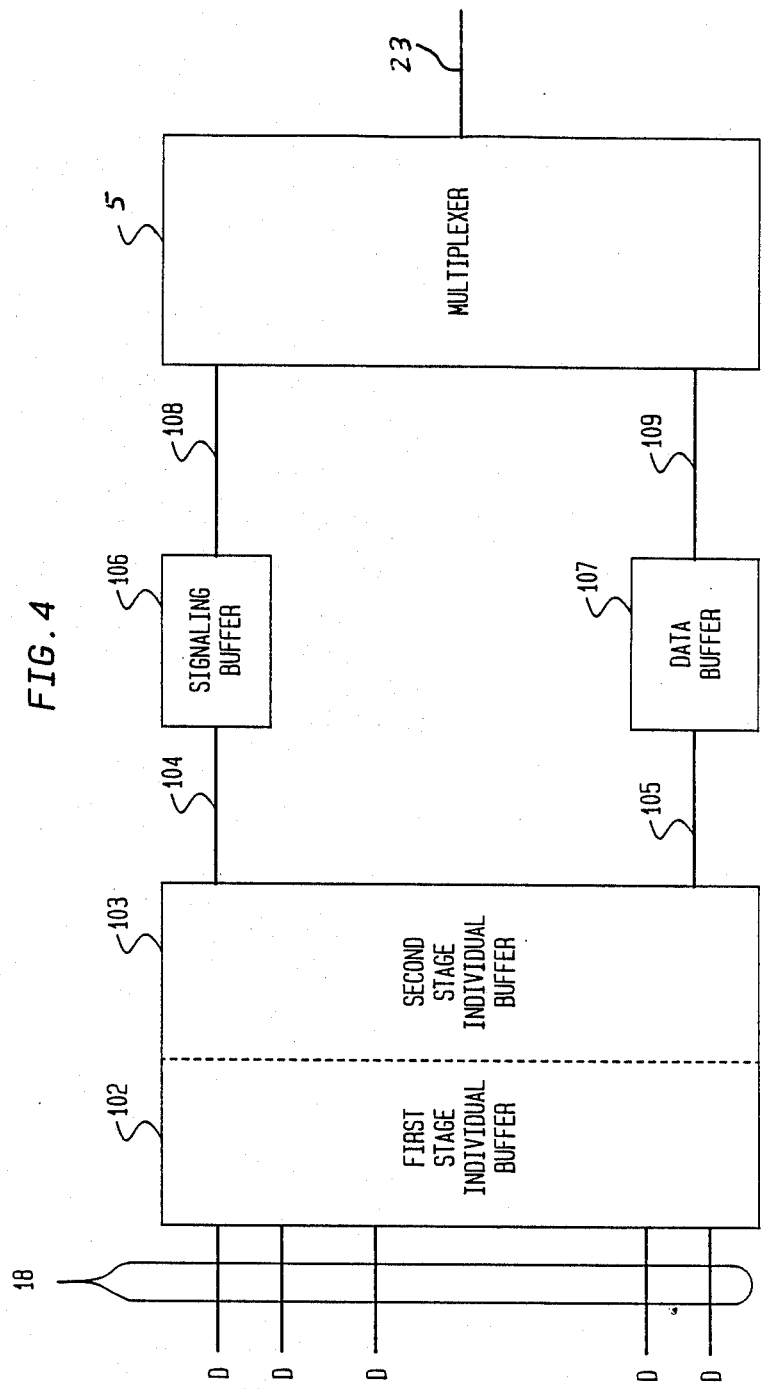
FIG. 4 is a block diagram of an enhancement to the queue storage device of FIG. 2.

Second, for certain D channel input traffic patterns, D channel allocations could fluctuate in syncopation to the incoming traffic requests. This is due to the fact that two time delays, 68 and 72, are encountered in the network of FIG. 3. The two-stage buffer system, as depicted in FIG. 4, interposed in line 18 before queue device 11 in FIG. 2, would alleviate this difficulty. (Queue device 11 is partitioned into its component parts in FIG. 4, namely, signaling buffer 106 and data buffer 107. Moreover, bi-directional line 18 is shown as comprising individual lines 104 and 105 as outputs of buffer 103 and individual lines 108 and 109 as outputs of buffers 106 and 107, respectively. Also, lines 108 and 109 combine to make up line 19 .) Each arriving packet on line 18 would pass through buffers 102 and 103. Upon arrival at buffer 102, if buffer 103 is empty, packet 101 would pass immediately into buffer 103. Otherwise, packet 101 would wait in buffer 102. In this way, controller 15 could monitor buffer 102 and buffer 103 (via line 19, T/R 12, maintenance channel 13, T/R 14, and line 21) to gain information on cyclic behavior over two time periods, and allocate D channel capacity accordingly.

Third, if certain signaling packets were shorter than time period k, unacceptable delays might result. An alternative, also embodied in FIG. 4, would be to Signaling packets would then be transported on line 104 and given priority over data packets transported on line 105 to data buffer 107, and would pass through to available D channels.

Finally, if traffic is very bursty, blockages will frequently occur. One approach to alleviate this situation would be to transmit voice traffic using 32 kbps instead of 64 kbps on a temporary basis. Some voice degradation would be encountered, but less blockages would result.

A further enhancement to the invention would be to use the maintenance channel to remotely change a customer's class of service at the remote terminal based on an instruction from the central station. Referring to FIG. 2, controller 15 would transmit such an instruction to multiplexer 5 via line 21, T/R 14, maintenance channel 13, T/R 12, and line 20. In this way, ordinary customer lines could be changed from ISDN to non-ISDN and vice versa, as well as other class of service adjustments.

Those ordinarily skilled in the art could design other variations on the embodiment without departing from the scope of my invention.

What is claimed is:

1. In combination with a network for transporting ISDN B and D channel communications on a multiple-channel link between a remote terminal with B and D channel traffic and a central station, the link including communications channels and a maintenance channel, the system comprising:
   remote terminal means including
   means for queuing incoming D channel traffic,
   means for communicating the queue utilization of the queuing means to the central station over the maintenance channel, and
   means for assigning B and D channel traffic to selected channels on the link in response to instructions received from the central station over the maintenance channel; and
   central station means including
   means for interpreting requests for B and D channel transport,
   means for receiving the queue utilization over the maintenance channel,
   means for applying pre-specified rules to the requests and queue utilization to determine the instructions, and
   means for transmitting the instructions to the remote terminal over the maintenance channel.

2. The system of claim 1 wherein the B channel requests are encoded on a D channel, and the central station further comprises means for translating B channel reguests from a D channel communication.

3. The system of claim 1 further comprising means at the central station for adjusting the prespecified rules in response to the characteristics of the requests as a function of time.

4. The system of claim 1 further comprising:
   means at the central station for communicating service requests to the remote terminal, and
   means at the remote terminal for receiving the service requests and changing a customer's service class at the remote terminal based on the service request.

5. An adaptive concentration arrangement for transmission of ISDN service by B and D channels over links between a first and second location comprising
   means at the first location for storing D channel packets not immediately transmitted to the second location,
   means at the second location responsive to the number of D channel packets stored at the first location for determining the number of said links to be used for D channel transmission and the number of said links to be used for B channel transmission, and
   means at the first location responsive to said determining means at the second location for connecting the appropriate number of said links to said storing means.

6. An adaptive concentration arrangement in accordance with claim 5 wherein said determining means at said second location include access congestion control circuitry comprising means including first delay means for determining the number of channels allocated for D channels and means including second delay means for determining the number of channels allocated for B channels.

7. An adaptive concentration arrangement in accordance with claim 6 wherein said storing means at said first location comprises two stage buffer means for ascertaining the cyclic behavior of channel allocations over successive time periods.

8. A method of providing basic ISDN access over a link between a remote terminal and a central station, comprising the steps of:
   queuing D channel traffic when insufficient capacity on the link is available for the traffic,
   determining the allocation of channels on the link for B and D channel service based on requests for B and D channel service, the amount of queued D channel traffic, and the application of pre-specified priority rules, and connecting customer lines with channels on the link in accordance with the determined allocation.

9. A method of providing basic ISDN access over a link between a remote terminal and a central station, comprising the steps of:

in the remote terminal, queuing D channel traffic when insufficient capacity on the link is available for the traffic, connecting incoming customer lines with outgoing capacity on the link in response to instructions from the central station, and transmitting the utilization of the queue to the central station over the link; and in the central station, interpreting requests made over the D channels for B and D channel service, determining, based on pre-specified rules, the subsequent allocation for B and D channels on the link, and communicating the determined allocation to the remote terminal over the link.

* * * * *

UNITED STATES PATENT AND TRADEMARK OFFICE
CERTIFICATE OF CORRECTION

PATENT NO. : 4,821,264

DATED : April 11, 1989

INVENTOR(S) : Noshik Kim

It is certified that error appears in the above-identified patent and that said Letters Patent is hereby corrected as shown below:

Column 1, line 65, after "for" insert --termination of traffic on an associated B channel.--;

Column 1, line 68, after "channel" insert --allocations are free, subsequent B channel requests would be--.

Column 2, line 41, after "packet" insert --traffic would take place at the remote terminal, the D--.

Column 3, line 13, after "various" insert --customer premises 91 and terminate in transmitter/receiver--.

Column 4, line 37, change "conves" to --conveys--.

Column 5, line 36, after "to" insert --establish signaling buffer 106 for signaling packets.--.

Column 6, line 21, change "reguests" to --requests--.

Signed and Sealed this

Fifth Day of June, 1990

Attest:

HARRY F. MANBECK, JR.

*Attesting Officer*      *Commissioner of Patents and Trademarks*